United States Patent [19]
Isawa et al.

[11] 3,969,547
[45] July 13, 1976

[54] PROCESS OF PREPARING POLYMER-COATED POWDER PARTICLES

[75] Inventors: Kazuo Isawa; Takayoshi Usuki, both of Tokyo; Hideo Nagasaka, Hitachi, all of Japan

[73] Assignee: The Fujikura Cable Works, Ltd., Tokyo, Japan

[22] Filed: Aug. 15, 1974

[21] Appl. No.: 497,648

[30] Foreign Application Priority Data
Aug. 17, 1973  Japan .................................. 48-92163

[52] U.S. Cl. ............................... 427/214; 427/216; 427/221; 427/215; 427/299; 427/327
[51] Int. Cl.² ........................ B05D 7/00; B05D 3/00
[58] Field of Search ............ 117/100; 427/221, 216, 427/214, 299, 327

[56] References Cited
UNITED STATES PATENTS

| 2,601,212 | 6/1952  | Polydoroff ............... | 117/100 B |
| 3,386,851 | 6/1968  | Harlan ..................... | 117/100 B |
| 3,565,559 | 2/1971  | Sato et al. ............... | 117/100 A |
| 3,657,144 | 4/1972  | Yoshida ................... | 117/100 C |
| 3,660,304 | 5/1972  | Matsukawa .............. | 117/100 A |
| 3,661,620 | 5/1972  | Dekking et al. ......... | 117/100 B |
| 3,664,963 | 5/1972  | Pasin ........................ | 117/100 A |
| 3,691,090 | 9/1972  | Kitajima .................. | 117/100 B |
| 3,703,474 | 11/1972 | Haber ...................... | 117/100 C |
| 3,737,337 | 6/1973  | Schnoring et al. ....... | 117/100 B |
| 3,780,195 | 12/1973 | Balassa .................... | 117/100 A |

*Primary Examiner*—Harry J. Gwinnell
*Assistant Examiner*—Dennis C. Konopacki
*Attorney, Agent, or Firm*—Toren, McGeady and Stanger

[57] ABSTRACT

Organic or inorganic particulate solid substances are coated with a polymeric material by dispersing the particulate solids, the surfaces of which have been treated so as to be compatible with the polymer coating, in a solution containing the polymer dissolved in a water-immiscible solvent, slowly introducing into the dispersion an aqueous solution of a hydrophilic protective colloid, thus producing an emulsifying liquid medium, and removing therefrom the solvent, to finally obtain polymer coated solid particles. The polymer-coated powder thus obtained is useful for application to various substrates by fluidized bed coating, electrostatic spraying, or electrophoretic deposition, followed by sintering to form films.

10 Claims, No Drawings

PROCESS OF PREPARING POLYMER-COATED POWDER PARTICLES

FIELD OF THE INVENTION

This invention relates to a novel process of preparing polymer-coated powder particles and articles made thereof.

DESCRIPTION OF THE PRIOR ART

Hithertofore, there has been practised a process of coating or encapsulating a particulate solid nucleus material with polymeric material, in which the polymer is dissolved in a water-immiscible organic solvent; the particulate solid is added to this solution with agitation to be dispersed and floated; the resulting dispersion is then introduced into an aqueous solution of a hydrophilic protective colloid to produce an emulsifying liquid medium; the emulsifying liquid medium is deprived of the polymer solvent by heating, followed by washing and drying steps, to finally obtain particulate solids, the particles of which have been coated or encapsulated with the polymer. This known process is, however, disadvantageous in that the solid powder to be treated should essentially be an organic substance which is compatible with the polymer coating. In other words, according to the conventional process, no suitable coating material has been found for particles of inorganic substances, such, as metal, its oxides, alloys, frits, and glass, which have a comparatively great specific gravity. Also, this known process disadvantageously tends to produce coated units of granules or capsules each enclosing and retaining two or more particles of the nucleus material, and consequently having a larger size than desired.

OBJECTS OF THE INVENTION

It is an object of this invention to provide a process to prepare polymer-coated particles of a particulate solid, such, as metal, its oxides, alloys, frits, or glass, each coated particle enclosing and retaining a single particle of the particulate solid.

It is another object of the invention to provide a process to make polymer-coated particulate articles suitable for application to inorganic substrates by fluid bed coating, electrostatic spraying, or electrocoating and capable of forming films by heat curing or sintering.

SUMMARY OF THE INVENTION

The inventors have carried out research on the coating of various inorganic particulate solids of metal, its oxides, alloys, frits, glass, etc., with any polymeric material which is soluble in hydrophobic organic solvents according to the conventional process. As a result, it has first been discovered that a good film of the polymer coating could be formed by pretreating the surfaces of the solid particles with a certain substance which is sufficiently compatible with the polymer coating. However, when the particulate solid was one having a comparatively great specific gravity, such, as, metal or alloy, the resulting polymer coated products or granules were often found to have enclosed a plurality of solid nuclei in a single granule. In order to eliminate this disadvantageous formation of particle irregularities, an attempt has been made to replace the step of producing the emulsifying liquid medium of the conventional process by slowly introducing an aqueous solution of a hydrophilic protective colloid into the polymer solution in which the inorganic powder particles have been dispersed; we have found that the resulting emulsifying liquid medium could be satisfactorily used for purposes of the present invention and that from this emulsifying medium, polymer-coated powder particles, each enclosing and retaining a single nucleus particles, could be produced, regardless of the specific gravity of the particulate material used.

The process of the present invention comprises dissolving a nonpolar polymer, such as polyethylene or a polar polymer such as, an acrylic resin in a liquid organic solvent which is immiscible with water, adding to the resulting solution under agitation particulate solids which have been applied with a suitable surface treatment, thus causing a liquid phase in which the particulate solids are floated and dispersed, and then slowly and little by little introducing under agitation into the dispersion thus obtained an aqueous solution of a hydrophilic protective colloid, to produce an emulsifying liquid medium, and thereafter, while agitating this emulsifying liquid medium, removing the solvent by a suitable manner, and washing and drying the remaining particulate matter, resulting in the formation of hard films over all over the surfaces of the individual solid particles.

The above process of the invention can eliminate the unwanted inclusion of two or more particles into a single coated or capsulated unit of a particulate solid, irrespective of its great or small specific gravity. This is because the slow introduction of the aqueous protective colloid solution into the solid particle dispersion makes the resulting emulsifying medium very uniform so that all of the solid particles are individually covered or capsulated with the polymer coating. Further, the uniform distribution in the emulsifying medium of the solid particles having a great specific gravity is ascribed to the gradual addition of the protective colloid under agitation, and such uniformly dispersed heavy solid particles as well as solid particles having a small specific gravity can be coated in a satisfactory condition.

A suitable manner for the removal of the solvent from the emulsifying liquid medium is to volatilize the solvent at room temperature or an elevated temperature under agitation or to add to the emulsifying liquid medium an extracting agent, such, as, methanol or ethanol, which is a non-solvent for the polymeric material and miscible with the polymer solvent and water, to extract the solvent into the aqueous solution usually under agitation, and then gradually volatilize off the extracted solvent. In carrying out this extraction process, one should be careful not to add the extracting agent in too large an amount at once, for too much extracting agent added at once would impair the uniform dispersion of the solid particles and induce the undesired phenomenon in which two or more particles are bonded together and enclosed into one coated unit. Therefore, it is preferred to use the extracting agent in an amount equal to or not exceeding that of the polymer solvent. Further in the extraction process, gas or air may be introduced in order to enhance its effect.

Immediately following the removal of the solvent, agitation is discontinued. Then the coated solid particle-containing liquid medium is deprived of its supernatant liquid phase by decantation, followed by repeated washing and drying, to finally obtain polymercoated powder particles.

The polymers used according to the process of this invention may be any polymeric substances which are soluble in a water-immiscible organic solvent. Examples are homopolymers or copolymers of olefins, such as, ethylene and propylene, vinyl esters, such as, vinyl acetate, vinyl ethers, such as, vinyl methyl ether, vinyl ethyl ether, and vinyl phenyl ether, acrylates, such as, methyl acrylate and ethyl acrylate, methacrylates, such as, methyl methacrylate and ethyl methacrylate, styrene, vinyl chloride, vinylidene chloride, acrylonitrile, methacrylonitrile, epoxy compounds, and derivatives thereof. Further examples are polyester, polyurethane, polyamide, polycarbonate, polysulfonate, chlorinated rubber, synthetic rubber, and cellulose derivatives, such as, ethyl cellulose. Any of the above-mentioned polymers may be used singly or in a mixture insofar as they are soluble in the same solvent.

Suitable the solvent for the above polymers are the conventional hydrocarbons, such as, n-hexane, cyclohexane, benzene, and toluene, halogenated hydrocarbons, such as, methylene chloride, trichloroethylene, carbontetrachloride, ethylene chloride, chloroform, and ethylene chloride fluoride, and ester solvents, such as, ethyl acetate. These solvents may be used singly or in mixture, or as a mixed solvent.

The particulate solid materials to which the polymer coating can be applied according to the invention include metal, its oxides, alloys, frits, glass and other inorganic materials having a comparatively great specific gravity as well as the usual organic materials like synthetic resins. Also included are glassy microhollowspheres, like the socalled "microbaloon." They are preferred to have a particle size ranging from about 0.5 to about 300 $\mu$ with a sharp size distribution, for a distribution of a wide range is, disadvantageously, apt to cause individual particles to combine together to make larger granules coated.

Further, the hydrophilic protective colloids used in the process of the invention are, usually, polyvinyl alcohol, gelatine and its derivatives, and aqueous solutions of cellulose derivatives, such as, hydroxyethylcellulose.

The pretreatment of the powder particle surfaces according to the present invention so that the surfaces are made compatible with the polymer coating may successfully be carried out either (1) by applying to the surfaces one of the following compounds, for example, alkyl amine, such as, stearyl amine, aliphatic acids having carboxyl groups, such as, stearic acid and montanic acid, and their metal salts, aliphatic acid esters, alkylbenzene sulfonic acid and its metal salts, alkyl esters of phosphoric acid, silane surface-treating agents, such as alkoxy silane, organic chromium compounds, and any other compounds which have both hydrophobic and hydrophilic groups in the same molecule, (2) by applying to the particle surfaces an activator, such as, hydrogen peroxide, phosphate, or chromate, or (3) by applying any one of the compounds of (1) above to the surfaces treated by application of (2) above. By the surface treatment, it is made possible to bond any desired polymeric material to the solid particle surfaces.

To summarize the above-described process of the invention, it is characterized by the following features.

1. Since the specified surface treatment is applied to the particulate solid, various polymeric materials including non-polar resins, such as, polyethylene can be suitably, singly or in mixture, used as the coating of the particles of the solid substances, irrespective of their kind and shape.

2. Since an aqueous solution of the hydrophilic protective colloid is slowly added to the solid-particle dispersion, individual solid particles, regardless of their size, are uniformly encapsulated in the polymer solvent to produce polymer-coated units of particles each enclosing a single particle, thus to avoiding the unwanted formation of granules each enclosing a plurality of the particles and, to the advantage of commercial production, increasing the yield of the objective polymer-coated particulate solids.

3. In the polymer solvent-removing step, the addition of an extracting agent to the emulsifying liquid medium serves to quickly extract the solvent in the aqueous and simultaneously volatilize off the extracted solvent, thus resulting in reducing the treatment hours, irrespective of the kind of polymer solvent used.

The coated powder particles prepared by the process of the invention as described above are useful for application as a coating to various substrates by fluidized bed coating, electrostatic spraying, or electrophoretic deposition coating, such coating being suitable for good films comprising no polymer residues by heat curing, fusing, or sintering. The substrates may include building materials used indoors and materials for bearings used on machinery.

The following examples illustrate the invention. In this examples, part and percentages are by weight and the designation of screen mesh is based on the Tyler Standard screen scale.

EXAMPLE 1

3 parts of polypropylene resin were dissolved in 26 parts of toluene with heat. To this solution were added 20 parts of aluminium powder passing through a 300-mesh screen, to which had been applied a surface treatment with stearic acid. The resulting liquid mixture was agitated by a screw type stirrer to float-disperse the aluminium powder particles, and into the resulting dispersion were slowly introduced 100 parts of a 3% solution of polyvinyl alcohol in water, followed by more vigorous agitation to emulsify the mixture. The resulting emulsifying liquid was then heated to about 60°C to volatilize the toluene. Thereupon, the polypropylene-coated particles having been precipitated on the bottom of the test vessel were washed well with water, followed by drying at 60°C for 1 hour, to finally produce polypropylene-coated aluminium particles, each enclosing and retaining a single nucleus. Such coated particles are, hereinafter, called uni-nucleus particles.

EXAMPLE 2

4 parts of methylmethacrylate resin were dissolved in 25 parts of methylene chloride. In this solution were added 15 parts of glass powder having a size of 20–75 $\mu$ which had been applied surface treatment with hydrogen peroxide (an activator), and this liquid mixture was agitated to float-disperse the glass powder particles, while 70 parts of a 4% solution of polyvinyl alcohol in water were added, followed by more vigorous agitation, to emulsify. The resulting emulsifying liquid was continuously agitated at room temperature to allow methylene chloride to volatilize. Thereupon, the agitation was discontinued, and the methylmethacrylate-coated particles having been precipitated in the test vessel were sufficiently washed with water, followed by drying at 60°C for 1 hour, to finally produce uni-nucleus methylmethacrylate-coated glass particles.

EXAMPLE 3

4 parts of methylmethacrylate resin were dissolved in 53 parts of methylene chloride. To this solution were added 75 parts of the same glass powder as used in Example 2, and this liquid mixture was agitated to float-disperse the glass powder particles, while 100 parts of a 2.5% solution of polyvinyl alcohol in water were added, followed by more vigorous agitation, to emulsify. Then, the same procedure as in Example 2 was repeated to finally yield uni-nucleus methylmethacrylate-coated glass particles similar to those produced by Example 2.

EXAMPLE 4

3 parts of polyethylene resin were dissolved in 23 parts of trichloroethylene. To this solution kept at about 70°C were added 57 parts of sphere-like copper powder passing through a 400 mesh screen, which had been surface treated with 0.2% stearic acid by weigh of copper powder, and the resulting liquid mixture was vigorously agitated to float-disperse the copper particles, while 70 parts of a 9% solution of polyvinyl alcohol in water heated at about 65°C were added, followed by more vigorous agitation, to emulsify. To the resulting emulsifying liquid were added 15 parts of methanol, followed by agitation at about 65°C for about 2 hours to extract and volatilize trichloroethylene. Thereafter, the residue was cooled down to room temperature and the precipitated polyethylene-coated particles were subjected to separation by decantation, followed by repeated washings with water and drying at 60°C for 1 hour, to finally obtain uni-nucleus polyethylene-coated copper particles. It was observed that about 92% of the whole polyethylene resin used adhered to the particle surfaces as the coating. Further, it was found that the time spent for the removal of trichloroethylene in this example was reduced by about 2 hours, or to about half of the time which would be required by volatilization with heating but without use of methanol or any other extracting agent.

For purposes of comparison, a similar procedure was repeated with copper powder which had not been subjected to any surface treatment, and the individual copper particles remained completely separating from or non-adhesive to the polymer material during the dispersing step.

EXAMPLE 5

3 parts of polyethylene resin were dissolved in 34 parts of trichloroethylene. To this solution kept at about 70°C were added 147 parts of the same copper powder as used in Example 4. This liquid mixture was agitated to float-disperse the copper particles, while 70 parts of a 3% solution of polyvinyl alcohol in water heated at about 65°C were added, followed by more vigorous agitation, to emulsify. To the resulting emulsifying liquid were added 15 parts of methanol, followed by agitation at 65°C for about 2 hours, to extract and volatilize trichloroethylene. Then, by way of the usual washing and drying processes, uni-nucleus polyethylene-coated copper powder particles similar to those produced in Example 4 were obtained.

EXAMPLE 6

4 parts of polyethylene resin were dissolved in 60 parts of trichloroethylene. To this solution were added 25 parts of frit powder passing through a 400-mesh screen, which had been subjected to a surface treatment with stearylamine. The resulting liquid mixture was agitated to form a float-dispersion of the frit particles, and to this dispersion were slowly added 70 parts of a 5% solution of polyvinyl alcohol in water to emulsify. To the resulting emulsifying liquid were added 25 parts of methanol, followed by agitation at about 65°C for about 2 hours to extract and volatilize trichloroethylene. Then, the residue was cooled down to room temperature and the precipitated polyethylene-coated particles were separated by decantation, followed by repeated washings with water and drying at 60°C for 1 hour, to finally produce uni-nucleus polyethylene-coated frit particles. The time spent for the removal of trichloroethylene in this example was reduced to about half of the time which would be required by volatilization in the absence of the extracting agent.

EXAMPLE 7

3 parts of polystyrene resin were dissolved in 42 parts of dichloromethane. To this solution were added 57 parts of iron powder passing through a 400-mesh screen, which had been subjected to a surface treatment with zinc phosphate (an activator). The resulting liquid mixture was agitated to float-disperse the iron powder particles, while 70 parts of a 7% solution of polyvinyl alcohol in water were added, followed by more vigorous agitation, to emulsify. To the resulting emulsifying liquid were slowly added 25 parts of methanol under continued agitation to extract and volatilize dichloromethane. Then, the agitating movement was discontinued and the precipitates were sufficiently washed and dried at about 60°C for 1 hour, to finally produce uni-nucleus polystyrene-coated iron powder particles. The time spent for the removal of dichloromethane in this example was about 1 hour, which was equal to two-fifths of the time which would be required by volatilization in the absence of the extracting agent.

EXAMPLE 8

1 part of polystyrene resin was dissolved in 12 parts of dichloromethane. Into this solution were introduced 59 parts of the same iron powder as used in Example 7. The resulting liquid was agitated to float-disperse the iron powder particles, while 70 parts of a 3% solution of polyvinyl alcohol in water were added, followed by more vigorous agitation, to emulsify. To the resulting emulsifying liquid were slowly added 12 parts of methanol under continued agitation to extract and volatilize dichloromethane. Subsequent procedures were the same as in Example 7, to obtain uni-nucleus polystyrene-coated iron particles.

EXAMPLE 9

3 parts of chlorinated rubber were dissolved in 27 parts of benzene. To this solution were added 20 parts of glass powder passing through a 400-mesh screen, which had been applied double surface treatments with hydrogen peroxide and thereafter with stearylamine, and the resulting liquid mixture was vigorously agitated to float-disperse the glass powder particles, while 70 parts of a 4% solution of polyvinyl alcohol in water were added, followed by more vigorous agitation, to emulsify. To the resulting emulsifying liquid were added 20 parts of methanol under continued agitation for about 2 hours, to extract and volatilize benzene. The precipitated substances were then well washed with water and dried at 60°C for 1 hour, to finally obtain uni-nucleus chlorinated rubber-coated glass powder particles. The time spent for the removal of benzene in this example was cut in half, compared to the case in which no methanol (the extracting agent) was employed.

EXAMPLE 10

22 parts of epoxy resin were dissolved in 2% of methylene chloride. To this solution were added 418 parts of sphere-like glass powder particles which had been subjected to a surface treatment with stearylamine in an amount equal to 0.2% of the weight of the glass powder, and the resulting liquid mixture was well agitated to float-disperse the glass particles, while 500 parts of a 3% solution of polyvinyl alcohol in water were slowly added, followed by more vigorous agitation, to emulsify. Then, in about 5–6 minutes, 150 parts of methanol was slowly added, under repeated agitation to extract and volatilize methylene chloride, and finally epoxy resin-coated glass particles were obtained.

The epoxy resin-coated glass particles thus obtained had the following particle size distribution in comparison with the uncoated glass powder material.

|  | Above 74 μ | 74–43 μ | Below 43 μ |
|---|---|---|---|
| Coated glass powder | 2% | 55% | 43% |
| Uncoated glass powder | 1.1% | 38.9% | 60% |

Upon further examination of the coated particles, it was found that the resin coating retained on each particle was 4.5–4.8 percent based on the weight of the coated particle in the different mesh sizes, and the almost all of them were uni-nucleus particles.

For comparison purposes, a similar procedure was repeated with the exception being that glass powder particles which had not been applied any surface treatment were used instead of the surface-treated material. The results were that the glass powder particles remained separated from the polymer material during the steps of dispersion under addition of an aqueous solution of polyvinyl alcohol as well as extraction under addition of methanol, and further that the polymer material alone grew into large lumps and almost no uni-nucleus polymer-coated particles were obtained.

EXAMPLE 11

22 parts of methyl methacrylate resin was dissolved in 270 parts of methylene chloride. To this solution were added 180 parts of frit powder passing through a 200-mesh screen, which had been subjected to a surface treatment with stearylamine in an amount equal to 2% of the weight of the frit powder, and the resulting liquid mixture was well agitated to float-disperse the frit powder particles, while added 600 parts of a 3% solution of polyvinyl alcohol in water were slowly added, followed by more vigorous agitation, to form a uniformly emulsifying liquid in which individual frit particles were covered by the polymer solvent. Into this emulsifying liquid were slowly introduced 150 parts of methanol under repeated agitation to have the methylene chloride extracted and volatilized, and finally methyl methacrylate resin-coated frit powder particles were obtained.

The methyl methacrylate resin-coated frit articles thus obtained had the following particle size distribution in comparison with the uncoated methyl methacrylate powder material.

|  | Above 74 μ | 74–53 μ | Below 53 μ |
|---|---|---|---|
| Coated frit powder | 21.3% | 34.4% | 44.3% |
| Uncoated frit powder | 0 | 31.2% | 68.8% |

Upon further examination of the coated particles, it was found that almost most of them were uni-nucleus particles and that amount of the resin coating retained on each coated particle was not substantially different quantitywise throughout the different mesh sizes.

For comparison purposes, a similar procedure was repeated with frit powder particles which had not been subjected to any surface treatment, to find that the resin coating did not cover the entire surfaces of each particle but covered only uneven areas on the surfce.

EXAMPLE 12

3 parts of polystyrene resin was dissolved in 30 parts of dichloromethane. To this solution were added 25 parts of glass powder particles passing through a 400-mesh screen, which had been subjected to double surface treatments, first with hydrogen peroxide (an activating agent) and then with γ-methacryloxypropyltrimethoxy silane. The resulting liquid mixture was agitated, while 50 parts of a 5% solution of polyvinyl alcohol in water were added, to form an emulsifying liquid in which the glass powder particles were floated and dispersed. The emulsifying liquid was subjected to continued agitation at room temperature to allow dichloromethane to volatilize. Thereafter, the precipitated substances were well washed with water and dried at 60°C for 1 hour, to produce uni-nucleus glass powder particles uniformly coated with polystyrene resin.

What is claimed is:

1. A process for preparing inorganic powder particles which are individually coated with a polymer comprising the steps of:
    a. dissolving a polymeric material in a water-immsicible organic solvent;
    b. float-dispersing an inorganic powder particles in the resulting solution, the surface of the particles having been treated with an activator selected from the group consisting of hydrogen peroxide, phosphate, and chromate, or a surface treating agent selected from the group consisting of aliphatic acids, amine compounds, and alkoxy silanes or both to make the surface of the particles compatible with the polymeric material;
    c. slowly adding to the resulting dispersion an aqueous solution of a hydrophilic protective colloid;
    d. removing the water-immiscible organic solvent from the resulting emulsifying liquid; and
    e. washing and drying the thus obtained individually coated particles.

2. The process of preparing polymer-coated powder particles as claimed in claim 1 wherein the removal of the water-immiscible organic solvent is carried out by volatilization.

3. The process of preparing polymer-coated powder particles as claimed in claim 1 wherein the removal of the water-immiscible organic solvent is carried out by adding to the emulsifying liquid an extracting agent which is a non-solvent for the polymeric material and miscible with both the water-immiscible organic solvent and water, extracting the water-immiscible organic solvent into the extracting agent, and allowing the water-immiscible organic solvent and the extracting agent to volatilize.

4. The process of preparing polymer-coated powder particles as claimed in claim 1 wherein the polymeric material is selected from the group consisting of polyolefin resins, polystyrene resin, polyvinyl chloride resin, chlorinated rubber, acryl resins, epoxy resins, polyester resin, and polyamide resin.

5. The process of preparing polymer-coated powder particles as claimed in claim 1 wherein the water-immiscible organic solvent is selected from the group consisting of halogen-substituted or unsubstituted hydrocarbons.

6. The process of preparing polymer-coated powder particles as claimed in claim 1 wherein the powder particles are selected from the group consisting of metal, metal oxides, frits, and glass.

7. The process of preparing polymer-coated powder particles as claimed in claim 6 wherein the powder particles have a particle size of from 0.5 to 300 $\mu$.

8. The process of preparing polymer-coated powder particles as claimed in claim 1 wherein the surface treatment is carried out by use of the activator and subsequently by use of the surface treating agent.

9. The process of preparing polymer-coated powder particles as claimed in claim 1 wherein the hydrophilic protective colloid is selected from the group consisting of polyvinyl alcohol, gelatine, and hydroxyethylcellulose.

10. The process of preparing polymer-coated powder particles as claimed in claim 3 wherein the extracting agent is a lower alcohol.

* * * * *

UNITED STATES PATENT OFFICE
CERTIFICATE OF CORRECTION

Patent No. 3969547        Dated July 13, 1976

Inventor(s) Kazuo Isawa et al

It is certified that error appears in the above-identified patent and that said Letters Patent are hereby corrected as shown below:

In the heading of the Patent Item [30] should read as follows:

-- [30] Foreign Application Priority Data

Aug. 17, 1973     Japan......48-92163
    Aug. 23, 1973     Japan......48-94586--.

Signed and Sealed this

Fourteenth Day of September 1976

[SEAL]

*Attest:*

RUTH C. MASON
*Attesting Officer*

C. MARSHALL DANN
*Commissioner of Patents and Trademarks*